US012345992B1

(12) United States Patent
Barnidge

(10) Patent No.: US 12,345,992 B1
(45) Date of Patent: Jul. 1, 2025

(54) SYSTEM HAVING AN OPTICAL TRANSMISSION LAYER FOR DIMMING ENHANCEMENT OF DISPLAY COMPRISING AN AMBIENT LIGHT SENSOR AND METHOD THEREFOR

(71) Applicant: Rockwell Collins, Inc., Cedar Rapids, IA (US)

(72) Inventor: Tracy J. Barnidge, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 18/443,477

(22) Filed: Feb. 16, 2024

(51) Int. Cl.
  *G02F 1/163*  (2006.01)
  *G02F 1/1335*  (2006.01)
  *G09G 3/36*  (2006.01)
  *G09G 3/38*  (2006.01)

(52) U.S. Cl.
  CPC ........ *G02F 1/163* (2013.01); *G02F 1/133528* (2013.01); *G09G 3/36* (2013.01); *G09G 3/38* (2013.01); *G09G 2320/0626* (2013.01); *G09G 2360/144* (2013.01)

(58) Field of Classification Search
  CPC .............................. G02F 1/1335; G09G 3/38
  See application file for complete search history.

(56) References Cited

U.S. PATENT DOCUMENTS

| 6,091,383 | A | * | 7/2000 | Borzea | H05B 33/02 |
| | | | | | 345/76 |
| 7,814,676 | B2 | | 10/2010 | Sampica et al. | |
| 8,118,075 | B2 | | 2/2012 | Sampica et al. | |
| 8,137,498 | B2 | | 3/2012 | Sampica et al. | |
| 8,540,002 | B2 | | 9/2013 | Sampica et al. | |
| 8,691,043 | B2 | | 4/2014 | Sampica et al. | |
| 8,746,311 | B1 | | 6/2014 | Sampica et al. | |
| 8,936,057 | B2 | | 1/2015 | Sampica et al. | |
| 9,097,891 | B2 | | 8/2015 | Border et al. | |
| 11,809,054 | B2 | | 11/2023 | Tiana et al. | |
| 2018/0284496 | A1 | * | 10/2018 | Chen | G02F 1/13476 |
| 2021/0200054 | A1 | * | 7/2021 | Tiana | G02F 1/13318 |
| 2022/0099874 | A1 | | 3/2022 | Qu et al. | |

FOREIGN PATENT DOCUMENTS

| CN | 111045265 | * | 9/2022 | .......... G02F 1/1337 |
| EP | 3183615 A1 | | 6/2017 | |

OTHER PUBLICATIONS

"Liquid Crystal Optimal Beam Shutters/Variable Attenuators" Thorlabs, https://www.thorlabs.com/newgrouppage9.cfm?objectgroup_id=8166.

(Continued)

*Primary Examiner* — Paul C Lee
(74) *Attorney, Agent, or Firm* — Suiter Swantz IP

(57) ABSTRACT

A system includes an optical transmission layer configured to allow a first luminance of illuminated images output from a display to pass through the optical transmission layer at a given time and to allow a second luminance of the illuminated images output from the display to pass through the optical transmission layer at another given time. The second luminance is one of dimmer or brighter than the first luminance.

19 Claims, 7 Drawing Sheets

(56) References Cited

OTHER PUBLICATIONS

B.Bahadur, et.al., "Direct Dry Film optical bonding—A low-cost, robust, and scalable display lamination technology.", Journal of the SID 19/11, 2011. p. 733.
Karl Guttag, "CES 2023 (Part 1)—Meta Materials' Breakthrough Dimming Technology", KGOnTech 2011-2023https://kguttag.com/2023/01/12/ces-2023-part-1-meta-materials-breakthrough-dimming-technology/.
Mil-L-85762A, Military Specification, Lighting, Aircraft, Interior, Night Vision Imaging System (NVIS) Compatible, Table IX Electronic and Electro-Optical Displays (Muti-Color), Aug. 26, 1988.

\* cited by examiner

600 ⟶

602 — RECEIVING, BY AT LEAST ONE PROCESSOR, AT LEAST ONE AMBIENT LIGHT SENSOR SIGNAL, ONE OR MORE OF THE AT LEAST ONE PROCESSOR COMMUNICATIVELY COUPLED TO THE AT LEAST ONE AMBIENT LIGHT SENSOR, THE AT LEAST ONE AMBIENT LIGHT SENSOR CONFIGURED TO OUTPUT AT LEAST ONE AMBIENT LIGHT SENSOR SIGNAL INDICATIVE OF AT LEAST ONE AMBIENT LIGHT BRIGHTNESS, ANY OR ALL OF THE AT LEAST ONE PROCESSOR COMMUNICATIVELY COUPLED TO AN OPTICAL TRANSMISSION LAYER, THE OPTICAL TRANSMISSION LAYER CONFIGURED TO ALLOW A FIRST LUMINANCE OF ILLUMINATED IMAGES OUTPUT FROM A DISPLAY TO PASS THROUGH THE OPTICAL TRANSMISSION LAYER AT A GIVEN TIME AND TO ALLOW A SECOND LUMINANCE OF THE ILLUMINATED IMAGES OUTPUT FROM THE DISPLAY TO PASS THROUGH THE OPTICAL TRANSMISSION LAYER AT ANOTHER GIVEN TIME, WHEREIN THE SECOND LUMINANCE IS ONE OF DIMMER OR BRIGHTER THAN THE FIRST LUMINANCE, WHEREIN THE OPTICAL TRANSMISSION LAYER COMPRISES AT LEAST ONE OF AT LEAST ONE ELECTROCHROMIC CELL OR AT LEAST ONE LIQUID CRYSTAL CELL

604 — BASED AT LEAST ON THE AT LEAST ONE AMBIENT LIGHT SENSOR SIGNAL, CAUSING, BY THE AT LEAST ONE PROCESSOR, THE OPTICAL TRANSMISSION LAYER TO CHANGE AN AMOUNT OF LUMINANCE OF THE ILLUMINATED IMAGES ALLOWED TO PASS THROUGH THE OPTICAL TRANSMISSION LAYER

FIG.6

SYSTEM HAVING AN OPTICAL TRANSMISSION LAYER FOR DIMMING ENHANCEMENT OF DISPLAY COMPRISING AN AMBIENT LIGHT SENSOR AND METHOD THEREFOR

BACKGROUND

Currently, displays that are installed within vehicles (e.g., aircraft) and exposed to ambient illumination conditions (e.g., positioned by windows, windscreens, etc.) are often required to have an extended dynamic luminance range to be compatible with both daytime and nighttime conditions to align with the adaptive eye response of the human visual system. For example, the guidance from SAE AS8034C, Section 3.11.6 Lighting states: " . . . . All display, control labels, and markings shall be clearly visible and easily readable in all flight deck lighting conditions."

The range of luminance output from an emissive display may be limited by the intensity of light generated from the array of active sub-pixel emitter elements (e.g., red, green, blue, etc.). Each active pixel element within a display may contribute to both the local grayscale and collective luminance required to form a perceivable image. Therefore, currently, offering a wide dimming range (low luminance to peak luminance) may be limited to the controls of the pixel drive circuit (e.g., bit depth, etc.) and the photometric response of the emitter device through its useful operating range.

Currently, the electro-optical response of an emitter in modern emissive displays is modeled as a theoretical light emitting diode and may require an active constant current source to stabilize light output. There typically exists an ideal operating range for each emitter in order to optimize useful life, maximize efficacy, overdrive protection and stable chromaticity. Further, the incremental steps in drive power for each emitter may be limited by the bit-depth capability of the display source driver. The need to command a wide dimming range (e.g., which may be required for avionics displays) while maintaining gray level bit depth to maintain a discernable image may be beyond a native display device's capabilities.

SUMMARY

In one aspect, embodiments of the inventive concepts disclosed herein are directed to a system. The system may include an optical transmission layer configured to allow a first luminance of illuminated images output from a display to pass through the optical transmission layer at a given time and to allow a second luminance of the illuminated images output from the display to pass through the optical transmission layer at another given time. The second luminance is one of dimmer or brighter than the first luminance.

In a further aspect, embodiments of the inventive concepts disclosed herein are directed to a method. The method may include: receiving, by at least one processor, at least one ambient light sensor signal, one or more of the at least one processor communicatively coupled to the at least one ambient light sensor, the at least one ambient light sensor configured to output at least one ambient light sensor signal indicative of at least one ambient light brightness, any or all of the at least one processor communicatively coupled to an optical transmission layer, the optical transmission layer configured to allow a first luminance of illuminated images output from a display to pass through the optical transmission layer at a given time and to allow a second luminance of the illuminated images output from the display to pass through the optical transmission layer at another given time, wherein the second luminance is one of dimmer or brighter than the first luminance, wherein the optical transmission layer comprises at least one of at least one electrochromic cell or at least one liquid crystal cell; and based at least on the at least one ambient light sensor signal, causing, by the at least one processor, the optical transmission layer to change an amount of luminance of the illuminated images allowed to pass through the optical transmission layer.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 6 is a diagram of an exemplary embodiment of a method according to the inventive concepts disclosed herein.

DETAILED DESCRIPTION

Figure 1:
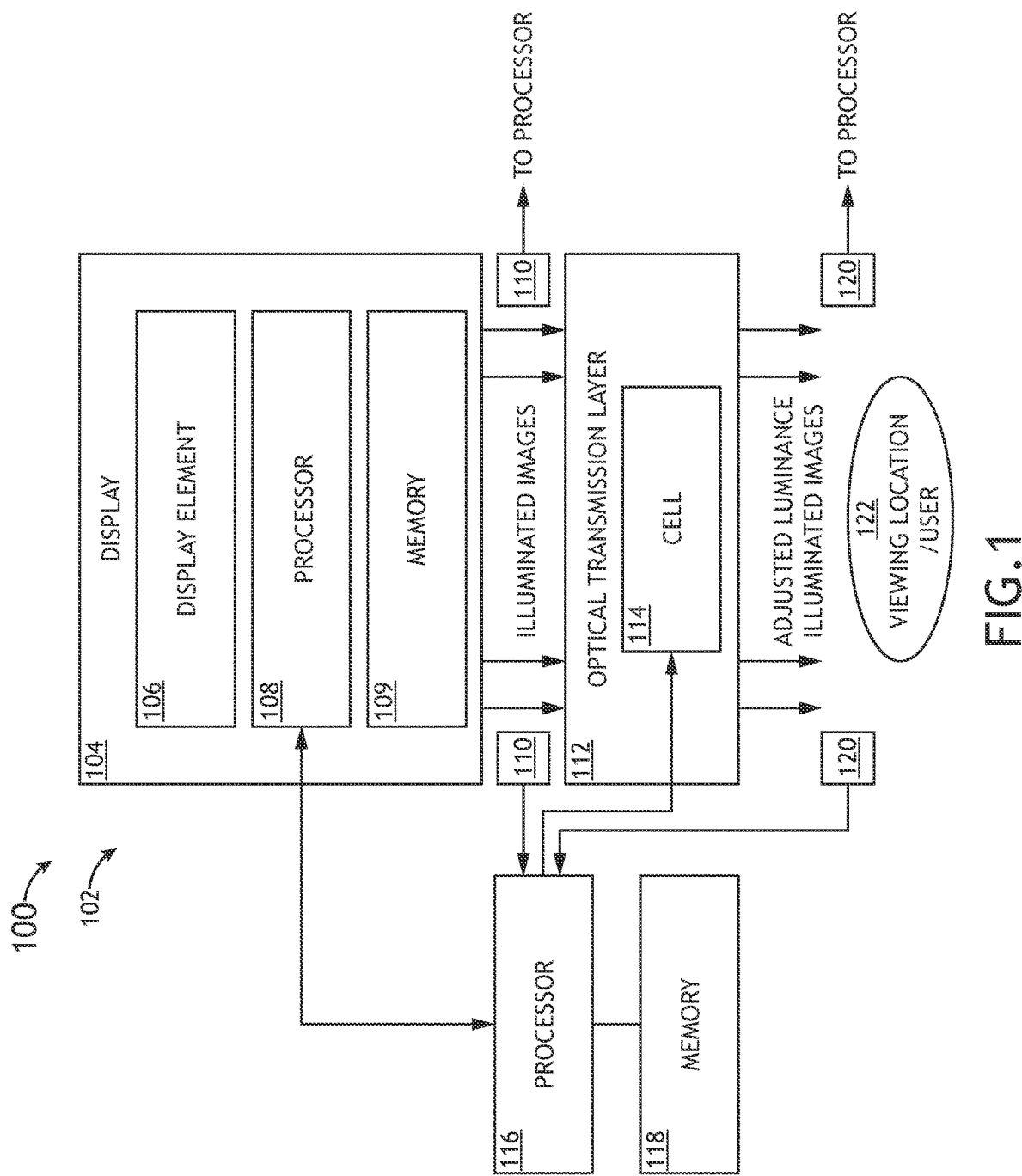
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a method and system, which may include an optical transmission layer that may be configured to allow a first luminance of illuminated images output from a display to pass through the optical transmission layer at a given time and to allow a second luminance of the illuminated images output from the display to pass through the optical transmission layer at another given time, wherein the second luminance may be one of dimmer or brighter than the first luminance.

Some embodiments may include an optical transmission layer (e.g., which may be electronically tunable), which may provide a neutral transmission across an intended spectral output of the display (e.g., at least a portion of the visible spectrum). In some embodiments, the optical transmission layer may be used to achieve a reduction in display luminance intensity output while allowing the emitter to be driven within an optimal operating range. The tunable transmission could also be set to maximum transmission throughout a useful dynamic range of the native display device and only be enabled when the useful dimming range of the native device is exhausted; this may allow an effective increase in dimming range beyond an original display device's native capabilities and avoid embedding a more complex drive circuit within such display device.

In some embodiments, a tunable optical transmission layer may be controlled over a single region (e.g., zone) covering the entire display uniformly or designed within a matrix of a pitch equal to an underlying native display pixel array.

In some embodiments, a dimming range of displays (e.g., which may output illuminated images) of a system having an optical transmission layer (e.g., which may be electronically tunable (e.g., dynamically tunable)) may: allow for the display to operate at an optimal emitter drive condition while achieving reduced luminance intensity; avoid embedding further complexity within the native display device in terms of the pixel drive, bit depth, and/or minimum photometric response of the emitter(s); enable common-off-the-shelf (COTS) display devices to be enhanced for avionics display applications; allow for no display device modification needed, other than the installation of the optical transmission layer in front of the display device; useable across a broad range of emissive display technologies (e.g., light emitting diode (LED) (e.g., organic (OLED) and/or MicroLED), quantum dot electroluminescent (QD-EL), etc.) that can achieve sustained high luminance output; allow transmittance to be tailored to a spectrum of the display and required compatibility (e.g., for a night vision imaging system (NVIS), etc.); adjust, over time (and/or periodically), a transmittance to account for luminance decay of the pixel emitters (e.g., by increasing transmittance of an optical transmission layer as a source emitter pixel becomes dimmer for a constant drive level, etc.); be removable and/or reusable; be replaced without sacrificing an underlying display device; offer an additional technique to achieve uniform dimming across multi-display cockpit installations; enable emissive display(s) to achieve a same dimming calibration of adjacent liquid crystal displays (LCDs); use principles of absorbing light to reduce luminance output; and/or have no reliance on reflectance of ambient light and/or on diffusing and/or scattering of display luminance (e.g., both of which could impact readability and/or cause viewer distractions).

In some embodiments, an optical transmission layer may be configured to adjust display luminance output to sustain display viewability across ambient lighting condition extremes (e.g., flying toward the sun above the clouds during the day and flying at night (e.g., away from the moon and/or during a lunar eclipse). In some embodiments, a processor (e.g., a controller) may be configured to adjust the optical transmission layer according to multiple settings. For example, a setting for display(s) luminance intensity may be set to "high" to sustain required contrast ratio, for example during the day. For example, a setting for display(s) luminance intensity may be set to "low" to minimize interfering with a viewer's dark adaptation eye response and maximize visibility of outside environment, for example during the night.

Referring now to FIGS. 1-6, exemplary embodiment of a system 100 according to the inventive concepts disclosed herein is depicted. In some embodiments, such as shown in FIG. 1, the system 100 may include at least one vehicle (e.g., at least one automobile, at least one train, at least one watercraft, at least one spacecraft, or at least one aircraft 102 (e.g., at least one helicopter and/or at least one airplane)), some or all of which may be communicatively coupled at any given time. In some embodiments, the vehicle (e.g., aircraft 102) may include at least one display 104, at least one display light senor 110, at least one optical transmission layer 112, at least one processor 116, at least one memory 118, at least one ambient light sensor 120, and/or at least one viewing location and/or viewing user 122, some or all of which may be communicatively and/or optically coupled at any given time. While the system 100 is exemplarily shown as including the vehicle (e.g., the aircraft 102), which may include any or all of the elements depicted in FIG. 1, any or all of such elements may be installed in any suitable vehicular or non-vehicular system; for example, the system may be implemented as a wearable system, such as head wearable system (e.g., a helmet (e.g., an aircraft helmet, spacesuit helmet, automobile helmet, soldier (e.g., infantry or artillery) helmet, or construction helmet)) including any or all of such elements of FIG. 1.

The display 104 may be any suitable display, such as a head-down display in a vehicle (e.g., the aircraft 102). In some embodiments, the display 104 may be an opaque display device (e.g., a head-down display; e.g., as opposed to a transparent viewable portion (e.g., combiner) of a head-up display (HUD) or waveguide display)). The display 104 may include at least one display element 106, at least one processor 108, and/or at least one memory 109, some or all of which may be communicatively and/or optically coupled at any given time. The display 104 may be configured to output illuminated images to the optical transmission layer 112 and/or the display light sensor 110. For example, the at least one display element 106 may be any suitable display element (e.g., at least one emissive display element (e.g., at least one light emitting diode (LED) display element and/or at least one micro-LED display element; e.g., which may emit light such that illuminated images are transmitted from the at least one transmissive display element) and/or at least one transmissive display element (e.g., at least one liquid crystal display (LCD) element; e.g., which may be backlit such that illuminated images are transmitted from the at least one transmissive display element)).

Some embodiments may be used for vetronics displays (e.g., avionics displays (e.g. commercial and/or military avionics display devices); e.g., automotive vetronics display devices), as well as for industrial displays and/or consumer displays.

For example, the at least one processor 108 may include at least one controller (e.g., at least one microcontroller), at least one central processing unit (CPU), at least one graphics processing unit (GPU), at least one field-programmable gate array (FPGA), at least one application specific integrated circuit (ASIC), at least one digital signal processor, at least one image processor, at least one deep learning processor unit (DPU), at least one virtual machine (VM) running on at least one processor, and/or the like configured to perform (e.g., collectively perform) any of the operations disclosed throughout. For example, the at least one processor 108 may include a CPU and a GPU configured to perform (e.g., collectively perform) any of the operations disclosed throughout. For example, the at least one processor 108 may include at least one FPGA configured to perform (e.g., collectively perform) any of the operations disclosed throughout. The processor 108 may be configured to run various software applications or computer code stored (e.g., maintained) in a non-transitory computer-readable medium (e.g., memory 109 and/or storage) and configured to execute various instructions or operations.

Figure 4:
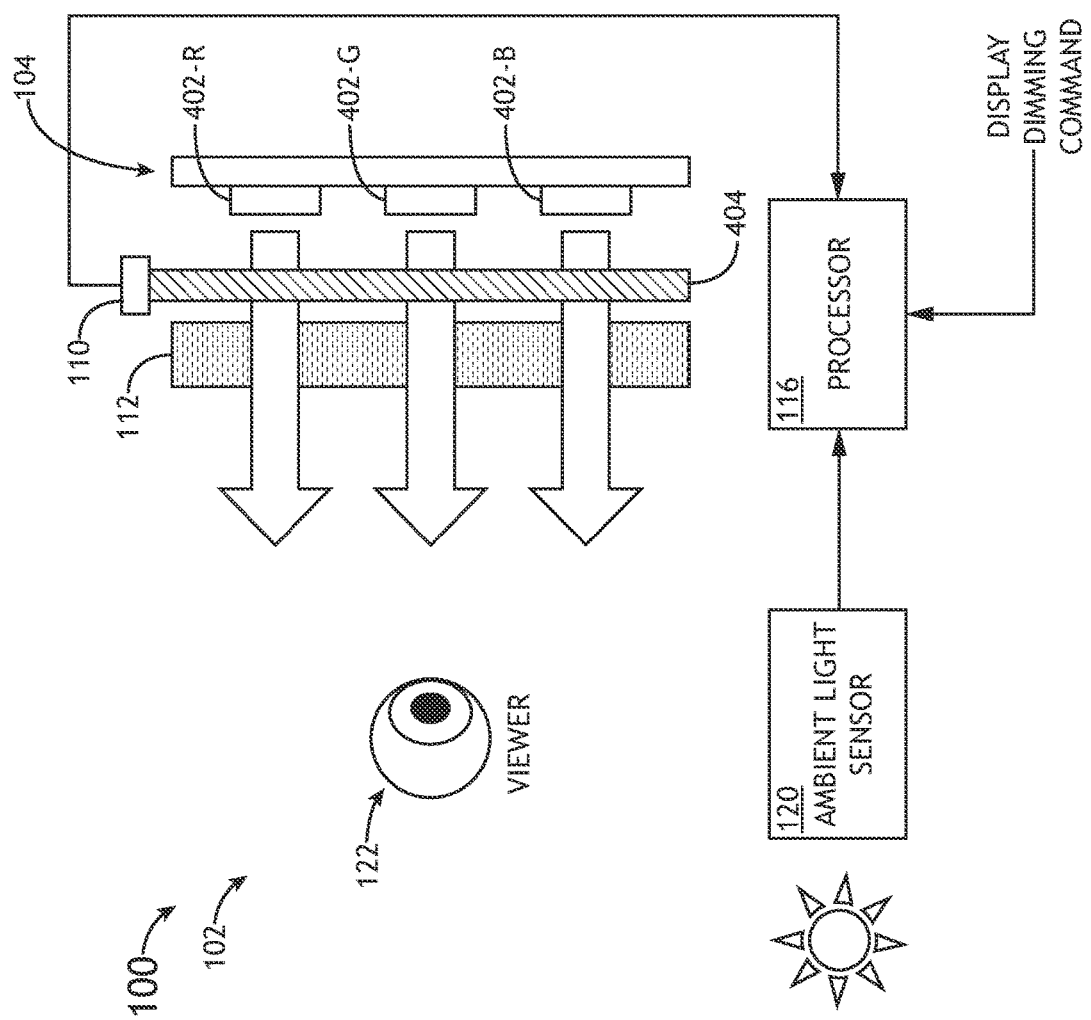
FIG. 4 is an exemplary diagrammatic view of the system of FIG. 1 according to the inventive concepts disclosed herein.

The at least one display light sensor 110 (e.g., a display light output sensor) may be any suitable sensor, such as at least one photodetector, configured to detect a luminance (e.g., an intensity and/or brightness) of light corresponding to illuminated images output from the display 104. In some embodiments, one or more of the at least one display light sensor 110 may reside in an optional optical layer 404 (e.g., as shown in FIG. 4). In some embodiments, at least one of the at least one processor (e.g., 108 and/or 116) may be communicatively coupled to the at least one display light sensor 110. For example, the at least one display light sensor 110 may be configured to output at least one display light sensor signal indicative of at least one light brightness associated with a given luminance of the illuminated images output from the display 104 at any given time.

Figure 2A:
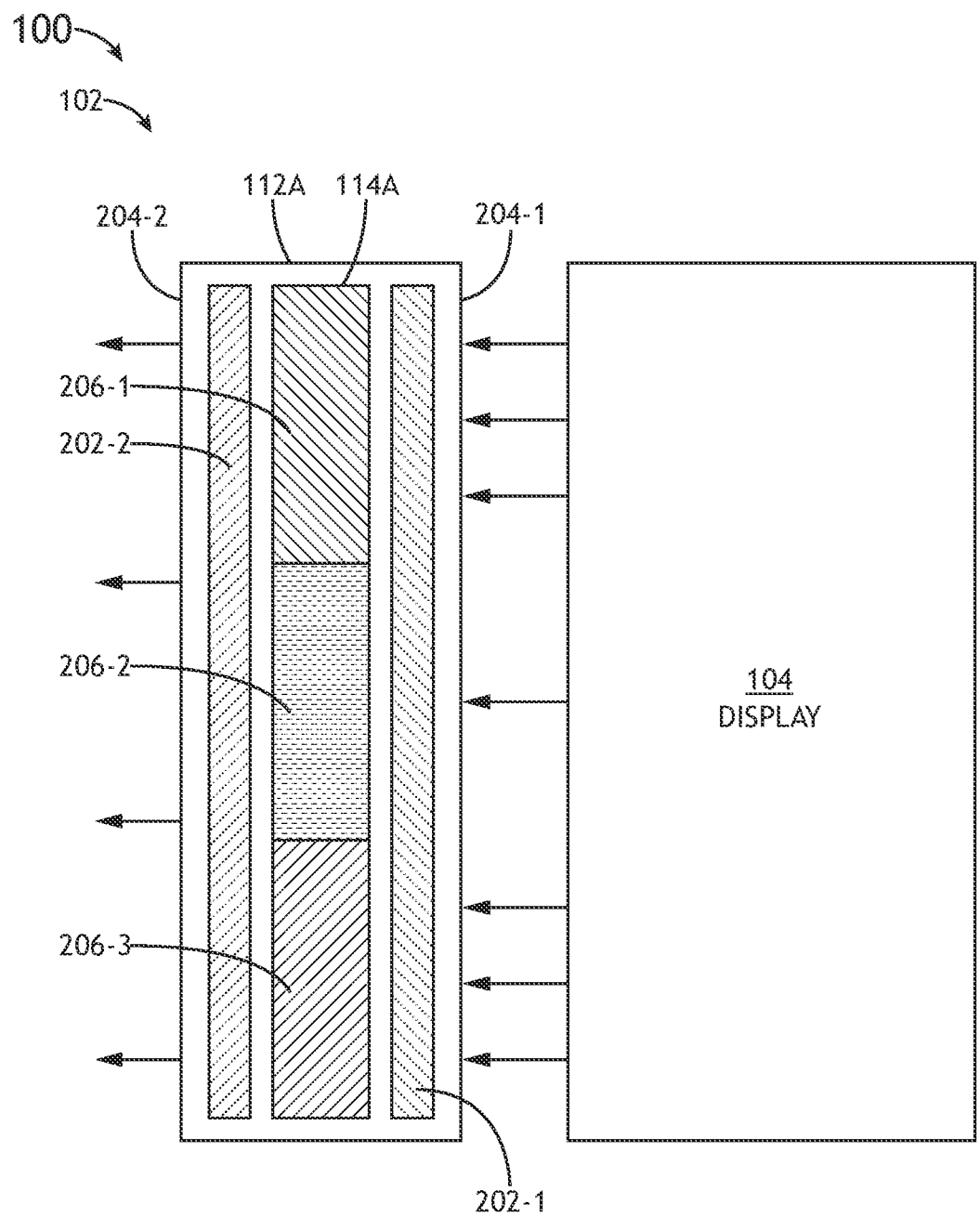
FIG. 2A is a view of an exemplary embodiment of the system of FIG. 1 having an optical transmission layer including an exemplary electrochromic cell according to the inventive concepts disclosed herein.
Figure 2B:
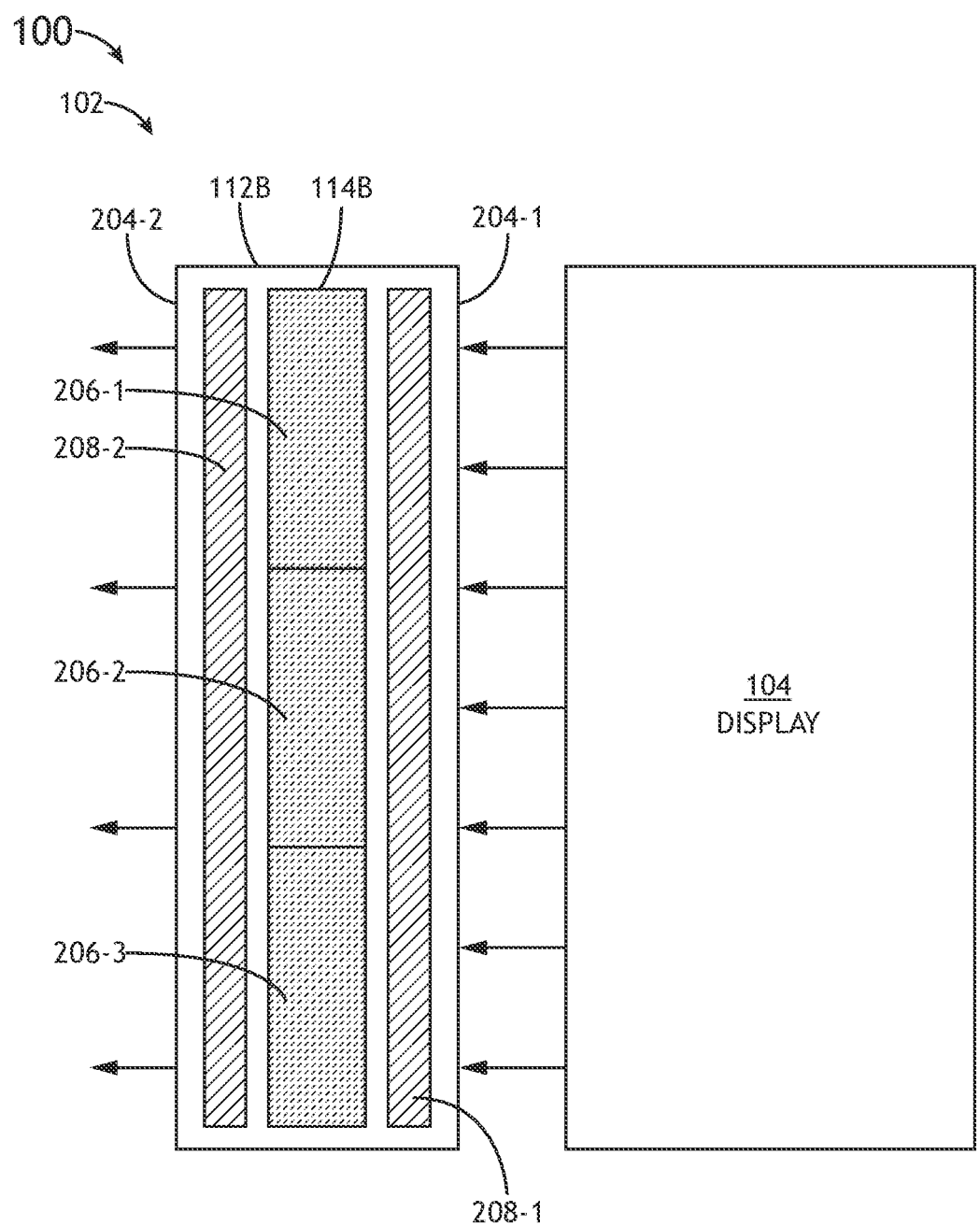
FIG. 2B is a view of an exemplary embodiment of the system of FIG. 1 having an optical transmission layer including an exemplary liquid crystal cell according to the inventive concepts disclosed herein.

Each of the at least one optical transmission layer 112 (e.g., 112A and/or 112B, as shown in FIGS. 2A and 2B) may be configured as any suitable optical layer, which may be configured to allow a first luminance of illuminated images output from the display 104 to pass through the optical transmission layer 112 at a given time and to allow a second luminance of the illuminated images output from the display to pass through the optical transmission layer at another given time, wherein the second luminance is one of dimmer or brighter than the first luminance. Any or all of the at least one processor (e.g., 108 and/or 116) may be communicatively coupled to the optical transmission layer 112. For example, each of the at least one optical transmission layer 112 may include at least one cell 114 (e.g., at least one electrochromic cell (e.g., 114A, as shown in FIG. 2A) and/or at least one liquid crystal cell (e.g., at least one liquid crystal shutter; e.g., 114B, as shown in FIG. 2B)). For example, each of the at least one cell 114 may span at least one region (e.g., 206-1, 206-2, and/or 206-3, as shown in FIG. 2A) of a surface (e.g., 204-1 and/or 204-2, as shown in FIGS. 2A and 2B) of the optical transmission layer 112. For example, the at least one cell 114 may be controlled (e.g., adjusted, activated, and/or deactivated) by the at least one processor (e.g., 108 and/or 116) to allow the first luminance of the illuminated images output from the display 104 to pass through the optical transmission layer 112 at the given time and to allow the second luminance of the illuminated images output from the display to pass through the optical transmission layer at the other given time. Each optical transmission layer 112 may be configured to reduce a luminance of the illuminated images output from the display 104 by absorbing light output from the display 104. For example, the optical transmission layer 112 may be positioned (e.g., installed in and/or on the display 104 (e.g., laminated to the display 104)) to receive the illuminated images from the display 104.

The at least one ambient light sensor 120 (e.g., a display light output sensor) may be any suitable sensor, such as at least one photodetector, configured to detect a luminance (e.g., an intensity and/or brightness level (e.g., as a digitized value)) of light corresponding to illuminated images output from the optical transmission layer 112. In some embodiments, one or more of the at least one ambient light sensor 120 may reside in an optional optical layer 404 and/or may be positioned (e.g., external to the optical transmission layer 112 and the display 104) to detect a luminance at a given viewing location and/or viewing user 122. In some embodiments, one or more of the at least one processor (e.g., 108 and/or 116) may be communicatively coupled to the at least one ambient light sensor 120. For example, the at least one ambient light sensor 120 may be configured to output at least one ambient light sensor signal indicative of at least one ambient light brightness.

For example, the at least one processor 116 may include at least one controller (e.g., at least one microcontroller), at least one central processing unit (CPU), at least one graphics processing unit (GPU), at least one field-programmable gate array (FPGA), at least one application specific integrated circuit (ASIC), at least one digital signal processor, at least one image processor, at least one deep learning processor unit (DPU), at least one virtual machine (VM) running on at least one processor, and/or the like configured to perform (e.g., collectively perform) any of the operations disclosed throughout. For example, the at least one processor 116 may include a CPU and a GPU configured to perform (e.g., collectively perform) any of the operations disclosed throughout. For example, the at least one processor 116 may include at least one FPGA configured to perform (e.g., collectively perform) any of the operations disclosed throughout. For example, the at least one processor 116 may include at least one microcontroller configured to perform (e.g., collectively perform) any of the operations disclosed throughout. The processor 116 may be configured to run various software applications or computer code stored (e.g., maintained) in a non-transitory computer-readable medium (e.g., memory 118 and/or storage) and configured to execute various instructions or operations.

Referring still to FIG. 1, the at least one processor (e.g., at least one processor 108 and/or at least one processor 116) may be any suitable processor or combination of processors configured (e.g., collectively configured, if more than one processor and/or if multiple processors are distributed among multiple devices) to perform any or all of the operations disclosed throughout. For example, the at least one processor (e.g., at least one processor 108 and/or at least one processor 116) may include at least one controller (e.g., at least one microcontroller), at least one central processing unit (CPU), at least one graphics processing unit (GPU), at least one field-programmable gate array (FPGA), at least one application specific integrated circuit (ASIC), at least one digital signal processor, at least one image processor, at least one deep learning processor unit (DPU), at least one virtual machine (VM) running on at least one processor, and/or the like configured to perform (e.g., collectively perform) any of the operations disclosed throughout.

For example, the at least one processor (e.g., at least one processor 108 and/or at least one processor 116) may be configured to: receive a display luminance command from an avionics device and/or avionics system; receive an ambient light intensity measurement from the ambient light sensor 120; receive a display light (e.g., with respect to light output from display 104) intensity measurement from the display light sensor 110 (e.g., a display light output sensor); determine a display luminance at viewing location and/or a viewing user 122 for a given commanded dimming level; determine a setpoint for the optical transmission layer 112 to achieve the commanded dimming level; and/or adjust the optical transmission layer 112 based at least on the setpoint.

For example, the at least one processor (e.g., at least one processor 108 and/or at least one processor 116) may be configured to: receive at least one display dimming command (e.g., a command from another device; e.g., a command to adjustably dim the display based at least sensor luminance signals (e.g., where such signals are output from sensor(s) 110 and/or 120)); receive the at least one ambient light sensor signal; based at least on the at least one ambient light sensor signal, cause the optical transmission layer 112 to change (e.g., by controlling the at least one cell 114) at least one amount of luminance of the illuminated images allowed to pass through the optical transmission layer 112; receive the at least one display light sensor signal; based at least on the at least one ambient light sensor signal and the at least one display light sensor signal, cause the optical transmission layer 112 to change (e.g., by controlling the at least one cell 114) at least one amount of luminance of the illuminated images allowed to pass through the optical transmission layer 112; based at least on the at least one ambient light sensor signal and the at least one display light sensor signal, determine at least one transmitted display luminance (e.g., corresponding to a viewable surface (e.g., second surface 204-2) of the optical transmission layer 112) and/or corresponding to at least one viewable portion of the surface (e.g., 204-2) for at least one region (e.g., 206-1, 206-2, and/or 206-3) of the cell 114 of the optical transmission layer 112) at at least one given viewing location (e.g., 122), the at least one transmitted display luminance transmitted from the optical transmission layer 112; based at least on the at least one determined transmitted display luminance, determine at least one setpoint for the optical transmission layer 112 to achieve at least one commanded and/or predetermined dimming level; based at least on the at least one determined transmitted display luminance, determine at least one setpoint for the optical transmission layer to achieve at least one commanded and/or predetermined dimming level; and/or based at least on the at least one determined setpoint, cause the optical transmission layer to change at least one amount of luminance of the illuminated images allowed to pass through the optical transmission layer so as to achieve the at least one commanded and/or the predetermined dimming level.

Referring now to FIGS. 2A and 2B, two exemplary embodiments of the optical transmission layer 112 (e.g., 112A and 112B) of FIG. 1, according to the inventive concepts disclosed herein, are depicted. For example, the optical transmission layer 112 (e.g., 112A and 112B) may have first and second surfaces 204-1, 204-2, where the illuminated images enter the optical transmission layer 112 (e.g., 112A and 112B) and exit the optical transmission layer 112 (e.g., 112A and 112B) as adjusted illuminated images (e.g., as dimmed illuminated images). Additionally, the at least one cell 114 (e.g., 114A and 114B) may have one or more regions (e.g., 206-1, 206-2, and/or 206-3), and/or the at least one cell 114 may be one or more cells 114 each corresponding to one or more regions (e.g., 206-1, 206-2, and/or 206-3). For example, each region (e.g., 206-1, 206-2, or 206-3) may correspond to a viewable portion (e.g., a strip (e.g., of strips), a tile (e.g., of a grid), a rectangle (e.g., of multiple rectangles), a circle, etc.) of the display 104, and/or each region (e.g., 206-1, 206-2, or 206-3) may correspond to a viewable portion of content (e.g., a window or an icon) displayed by the display 104.

Referring now to FIG. 2A, each optical transmission layer 112A may include conductive electrodes 202-1, 202-2 coupled to the at least one electrochromic cell 114A.

Referring now to FIG. 2B, each optical transmission layer 112B may include first and second polarizers 208-1, 208-2. The first polarizer 208-1 may span a first surface 204-1 of the optical transmission layer 112B, and the second polarizer 208-2 may span a second surface 204-2 of the optical transmission layer 112B.

Figure 3A:
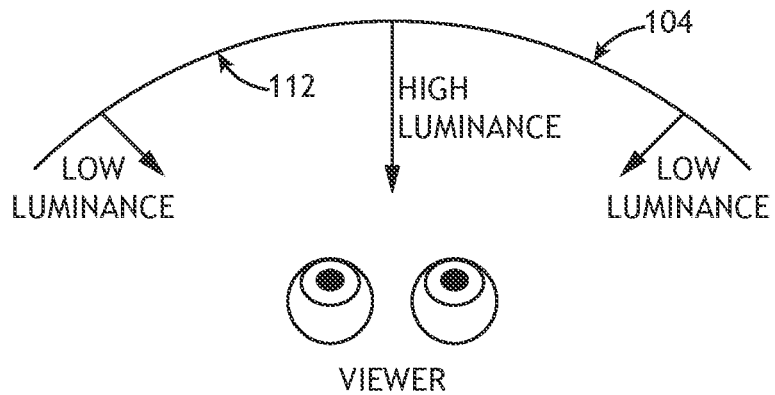
FIGS. 3A-3B are views of an exemplary embodiment of the system of FIG. 1 having an optical transmission layer positioned in front of a display according to the inventive concepts disclosed herein.
Figure 3B:
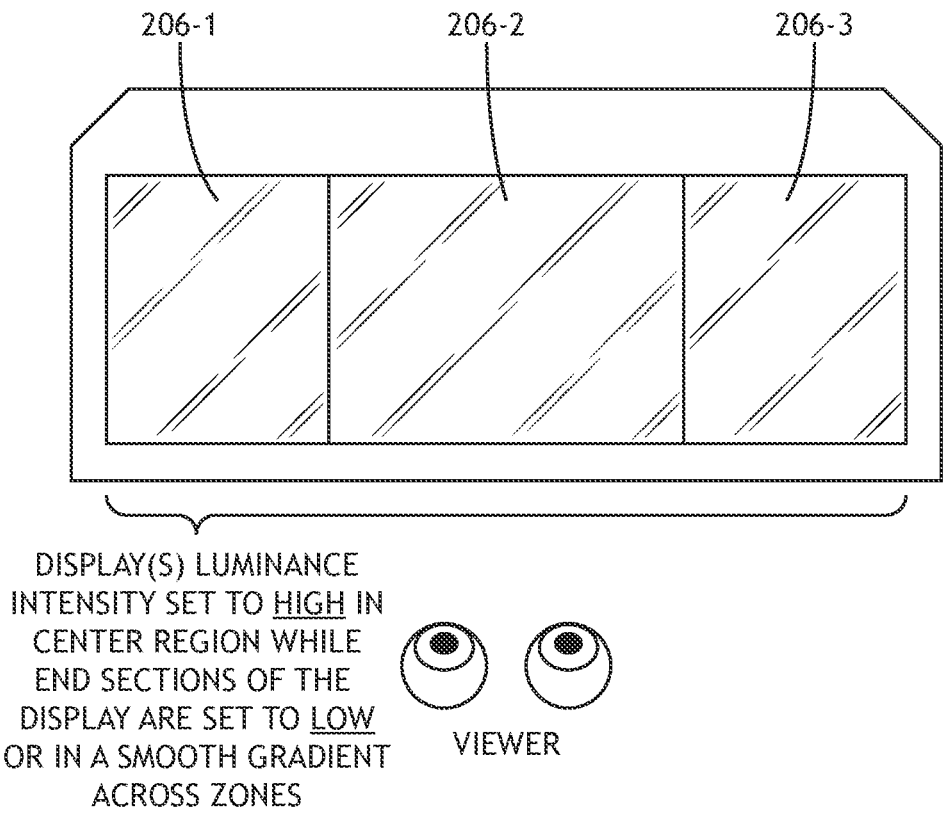

Referring now to FIGS. 3A and 3B, two views (e.g., a top view as shown in FIG. 3A and a front view as shown in FIG. 3B) of an exemplary embodiment of the optical transmission layer 112 (e.g., 112A and 112B) and display 104 of FIG. 1, according to the inventive concepts disclosed herein, are depicted. For example, the display 104 may be a curved display, as shown; and the optical transmission layer 112 may be flexible such that the optical transmission layer 112 may be positioned on and/or in the curved display. Additionally, the at least one cell 114 (e.g., 114A and/or 114B) of the optical transmission layer 112 (e.g., 112A and 112B) may have multiple regions (e.g., 206-1, 206-2, and/or 206-3). For example, the display 104 may have tiled zones (e.g., each of which may correspond to one of the multiple regions (e.g., 206-1, 206-2, and/or 206-3)) across the display 104 (e.g., which may be a display(s) of an instrument panel if certain display portions and/or or certain displays are needed to be dimmed due to off-axis reflections in a cockpit. In addition, a portion of the display 104 could be enhanced for dimming by applying the optical transmission layer 112 to only a portion (e.g., an area where higher luminance content may be typically placed) of the display 104. The optical transmission layer 112 may also be useful in flat, semi-flat or curved displays where the extents of the display 104 may need to be dimmed while a center zone (e.g., region) is not dimmed to control internal reflection in the cockpit. For example, the display(s) luminance intensity may be set to "high" in a center region while end sections of the display may be set to "low".

In some embodiments, the optical transmission layer 112 may be positioned on and/or in (e.g. installed on and/or in (e.g., applied to (e.g., laminated onto))) the display 104 (e.g., which may be a common-off-the-shelf (COTS) display). For example, suitable techniques may include any of the techniques disclosed in any or all of the following U.S. Pat. Nos. 8,691,043; 7,814,676; 8,137,498; 8,540,002; 8,746,311; 8,118,075; and/or 8,936,057, all of which are incorporated by reference in their entirety herein. For example, suitable techniques may include any of the techniques disclosed in the following publication: B. Bahadur, et. al., "*Direct Dry Film optical bonding—A low-cost, robust, and scalable display lamination technology.*", Journal of the SID 19/11, 2011. p. 733).

Referring now to FIG. 4, a view (e.g., a cross-sectional diagrammatic view as shown in FIG. 4) of an exemplary embodiment of the system 100 having the optical transmission layer 112 (e.g., 112A and 112B) and the display 104 of FIG. 1, according to the inventive concepts disclosed herein, is depicted. For example, the display element 106 of the display 104 may have pixels and/or sub-pixels (e.g., emissive display pixels and/or sub-pixels; e.g., color and/or monochrome pixels; e.g., red-green-blue (RGB) sub-pixels, such as red sub-pixels 402-R configured to output red light, green sub-pixels 402-G configured to output green light, blue sub-pixels 402-B configured to output blue light, white sub-pixels (not shown) configured to output white light). In some embodiments, the system may optionally include an optical layer 404 configured to direct light from the illuminated images output from the display 104 toward the display light sensor 110. For example, the optical layer 404 may reside in between the display 110 and the optical transmission layer 112; for example, as shown in FIG. 4, the optical layer 404 may be separate from the display 110 and the optical transmission layer 112; however, in other embodiments, the display 104 and/or the optical transmission layer 112 may include the optical layer 404.

In some embodiments, the optical transmission layer 112 may be adjusted (e.g., by the at least one processor 108 and/or 116) to operate with any of multiple settings and/or under any of various environmental states (e.g., day, dawn, dusk, and/or night) to adjust the optical transmission layer 112 such that a desired amount of luminance is transmitted to the viewing location and/or viewing user (e.g., 122), such as at any given time and/or during any given environmental condition.

In some embodiments, a typical suitable avionics display may have a maximum luminance range of 100-300 foot-lambert (fL). In some embodiments, a typical suitable avionics display may have a minimum luminance range of 0.5 fL. In some embodiments, such a typical suitable avionics display may have a high ambient contrast ratio (e.g., 3:1 to 10:1). In some embodiments, such a typical suitable avionics display may have a dimming range that can be greater than or equal to 1,000:1 for avionics applications.

For example, during a first exemplary state, the optical transmission layer 112 may be adjusted to allow for a high (e.g., maximum; e.g., for bright environmental conditions) display luminance, such that a high (e.g., maximum) display luminance is observable at the viewing location and/or viewing user. For example, the optical transmission layer 112 may be set to a high (e.g., maximum) transmittance according to a high (e.g., maximum) transmittance setpoint.

For example, during a second exemplary state, the optical transmission layer 112 may be adjusted to allow for a medium (e.g., for normal environmental conditions) display luminance, such that a medium display luminance is observable at the viewing location and/or viewing user. For example, the optical transmission layer 112 may be set to medium transmittance according to a medium transmittance setpoint.

For example, during a third exemplary state, the optical transmission layer 112 may be adjusted to allow for a low (e.g., minimum; e.g., for dark environmental conditions) display luminance, such that a low display luminance is observable at the viewing location and/or viewing user. For example, the optical transmission layer 112 may be set to a low (e.g., minimum) transmittance according to a low (e.g., minimum) transmittance setpoint.

In some embodiments, with respect to any or all of the above exemplary states, the RGB sub-pixels 402-R, 402-G, 402-B and/or a gray-shade may be set to a fixed intensity range for each of the RGB Color. In other embodiments, which are not explained with respect to such exemplary states but would be understood to those of skill in the art, the RGB sub-pixels 402-R, 402-G, 402-B and/or the gray-shade may be set to a variable intensity range for each of the RGB Color.

Figure 5:
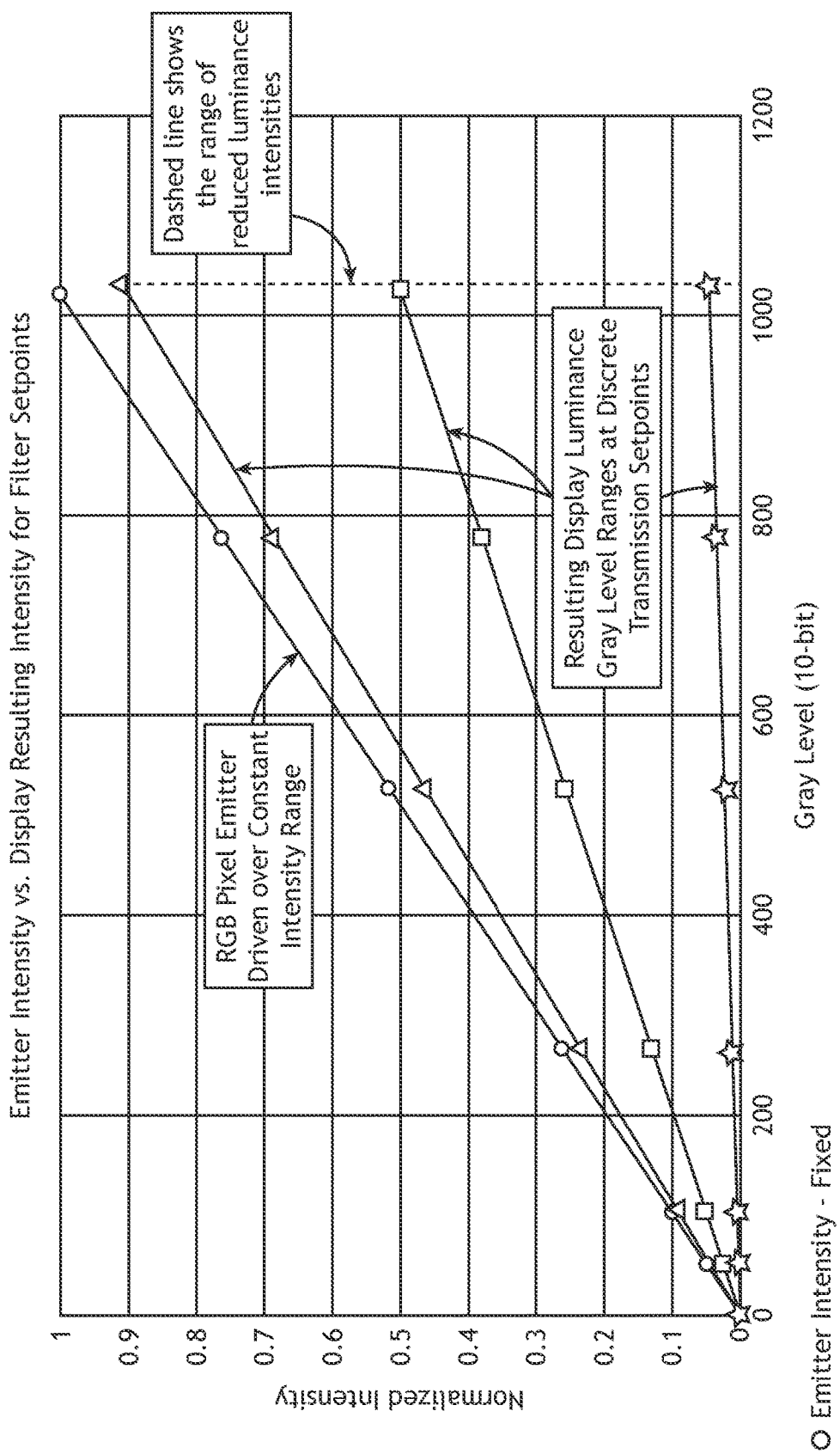
FIG. 5 is an exemplary and contemplated graph associated with an embodiment of the system of FIG. 1 according to the inventive concepts disclosed herein.

Referring now to FIG. 5, a graph of emitter intensity (e.g., of an illuminative display, such as display 104) versus display resulting intensity for filter setpoints associated with an exemplary contemplated embodiment of the system 100 having the optical transmission layer 112 (e.g., 112A and/or 112B) and the display 104 of FIG. 1, according to the inventive concepts disclosed herein, is depicted. The graph of FIG. 5 shows an exemplary contemplated measurement result for a dimming concept of some embodiments. For example, a given normalized display luminance intensity, as measured at a viewing location 122, is shown for each display commanded gray-level (e.g., from minimum to maximum gray-level).

The line, labeled "Emitter Intensity-Fixed", shows a baseline normalized luminance without the presence of an optical transmission layer 112 in front of the display 104.

The lines, labeled "Dimmable Filter Transmission Setpoint-High", "Dimmable Filter Transmission Setpoint-Medium", and "Dimmable Filter Transmission Setpoint-Low" show expected normalized luminance intensity, as would be expected to be measured at the viewing location, for a high, medium and low transmission setting on the optical transmission layer 112, respectively.

Referring now to FIG. 6, an exemplary embodiment of a method 600 according to the inventive concepts disclosed herein may include one or more of the following steps. Additionally, for example, some embodiments may include performing one or more instances of the method 600 iteratively, concurrently, and/or sequentially. Additionally, for example, at least some of the steps of the method 600 may be performed in parallel, iteratively, and/or concurrently. Additionally, in some embodiments, at least some of the steps of the method 600 may be performed non-sequentially.

A step 602 may include receiving, by at least one processor, at least one ambient light sensor signal, one or more of the at least one processor communicatively coupled to the at least one ambient light sensor, the at least one ambient light sensor configured to output at least one ambient light sensor signal indicative of at least one ambient light brightness, any or all of the at least one processor communicatively coupled to an optical transmission layer, the optical transmission layer configured to allow a first luminance of illuminated images output from a display to pass through the optical transmission layer at a given time and to allow a second luminance of the illuminated images output from the display to pass through the optical transmission layer at another given time, wherein the second luminance is one of dimmer or brighter than the first luminance, wherein the optical transmission layer comprises at least one of at least one electrochromic cell or at least one liquid crystal cell.

A step 604 may include, based at least on the at least one ambient light sensor signal, causing, by the at least one processor, the optical transmission layer to change an amount of luminance of the illuminated images allowed to pass through the optical transmission layer.

Further, the method 600 may include any of the operations disclosed throughout.

Referring generally again to FIGS. 1-6, as will be appreciated from the above, embodiments of the inventive concepts disclosed herein may be directed to a method and system, which may include an optical transmission layer that may be configured to allow a first luminance of illuminated images output from a display to pass through the optical transmission layer at a given time and to allow a second luminance of the illuminated images output from the display to pass through the optical transmission layer at another given time, wherein the second luminance may be one of dimmer or brighter than the first luminance.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
an optical transmission layer configured to allow a first luminance of illuminated images output from a display to pass through the optical transmission layer at a given time and to allow a second luminance of the illuminated images output from the display to pass through the optical transmission layer at another given time, wherein the second luminance is one of dimmer or brighter than the first luminance, wherein the optical transmission layer comprises at least one cell;
at least one processor; and
at least one ambient light sensor, one or more of the at least one processor communicatively coupled to the at least one ambient light sensor, any or all of the at least one processor communicatively coupled to the optical transmission layer, the at least one ambient light sensor configured to output at least one ambient light sensor signal indicative of at least one ambient light brightness;
wherein the at least one processor is configured to: receive the at least one ambient light sensor signal;
wherein the optical transmission layer is configured to reduce a luminance of the illuminated images output from the display by absorbing light output from the display.

2. The system of claim 1, wherein the optical transmission layer comprises at least one electrochromic cell, each of the at least one electrochromic cell spanning at least one region of a surface of the optical transmission layer.

3. The system of claim 2, wherein the optical transmission layer further comprises conductive electrodes coupled to the at least one electrochromic cell.

4. The system of claim 1, wherein the optical transmission layer comprises at least one liquid crystal cell, each of the at least one liquid crystal cell spanning at least one region of a surface of the optical transmission layer.

5. The system of claim 2, wherein the optical transmission layer further comprises first and second polarizers, the first polarizer spanning a first surface of the optical transmission layer, the second polarizer spanning a second surface of the optical transmission layer.

6. The system of claim 1, wherein the at least one processor is further configured to: based at least on the at least one ambient light sensor signal, cause the optical transmission layer to change an amount of luminance of the illuminated images allowed to pass through the optical transmission layer.

7. A method, comprising:
receiving, by at least one processor, at least one ambient light sensor signal, one or more of the at least one processor communicatively coupled to the at least one ambient light sensor, the at least one ambient light sensor configured to output at least one ambient light sensor signal indicative of at least one ambient light brightness, any or all of the at least one processor communicatively coupled to an optical transmission layer, the optical transmission layer configured to allow a first luminance of illuminated images output from a display to pass through the optical transmission layer at a given time and to allow a second luminance of the illuminated images output from the display to pass through the optical transmission layer at another given time, wherein the second luminance is one of dimmer or brighter than the first luminance, wherein the optical transmission layer comprises at least one of at least one electrochromic cell or at least one liquid crystal cell; and
based at least on the at least one ambient light sensor signal, causing, by the at least one processor, the optical transmission layer to change an amount of luminance of the illuminated images allowed to pass through the optical transmission layer;
wherein the optical transmission layer is configured to reduce a luminance of the illuminated images output from the display by absorbing light output from the display.

8. A system, comprising:
an optical transmission layer configured to allow a first luminance of illuminated images output from a display to pass through the optical transmission layer at a given time and to allow a second luminance of the illuminated images output from the display to pass through the optical transmission layer at another given time, wherein the second luminance is one of dimmer or brighter than the first luminance, wherein the optical transmission layer comprises at least one cell;
at least one processor;
at least one display light sensor; and
at least one ambient light sensor, one or more of the at least one processor communicatively coupled to the at least one ambient light sensor, any or all of the at least one processor communicatively coupled to the optical transmission layer, the at least one ambient light sensor configured to output at least one ambient light sensor signal indicative of at least one ambient light brightness;
wherein the at least one processor is configured to: receive the at least one ambient light sensor signal;
wherein at least one of the at least one processor is communicatively coupled to the at least one display light sensor, the at least one display light sensor configured to output at least one display light sensor signal indicative of at least one light brightness associated with a given luminance of the illuminated images output from the display at any given time;
wherein the at least one processor is further configured to: receive the at least one display light sensor signal.

9. The system of claim 8, wherein the at least one processor is further configured to: based at least on the at least one ambient light sensor signal and the at least one display light sensor signal, cause the optical transmission layer to change an amount of luminance of the illuminated images allowed to pass through the optical transmission layer.

10. The system of claim 8, wherein the at least one processor is further configured to: based at least on the at least one ambient light sensor signal and the at least one display light sensor signal, determine a transmitted display luminance at a given viewing location, the transmitted display luminance transmitted from the optical transmission layer.

11. The system of claim 10, wherein the at least one processor is further configured to: based at least on the determined transmitted display luminance, determine a setpoint for the optical transmission layer to achieve a commanded and/or predetermined dimming level.

12. The system of claim 11, wherein the at least one processor is further configured to: based at least on the determined setpoint, cause the optical transmission layer to change an amount of luminance of the illuminated images allowed to pass through the optical transmission layer so as to achieve the commanded and/or the predetermined dimming level.

13. The system of claim 8, wherein the optical transmission layer is configured to reduce a luminance of the illuminated images output from the display by absorbing light output from the display.

14. A system, comprising:
a display;
an optical transmission layer configured to allow a first luminance of illuminated images output from the display to pass through the optical transmission layer at a given time and to allow a second luminance of the illuminated images output from the display to pass through the optical transmission layer at another given time, wherein the second luminance is one of dimmer or brighter than the first luminance, wherein the optical transmission layer comprises at least one cell, wherein the optical transmission layer is positioned to receive the illuminated images from the display;
at least one processor; and
at least one ambient light sensor, one or more of the at least one processor communicatively coupled to the at least one ambient light sensor, any or all of the at least one processor communicatively coupled to the optical transmission layer, the at least one ambient light sensor configured to output at least one ambient light sensor signal indicative of at least one ambient light brightness;
wherein the at least one processor is configured to: receive the at least one ambient light sensor signal; and based at least on the at least one ambient light sensor signal, cause the optical transmission layer to change an amount of luminance of the illuminated images allowed to pass through the optical transmission layer.

15. The system of claim 14, wherein the optical transmission layer is laminated to the display.

16. The system of claim 14, wherein display comprises the at least one processor.

17. The system of claim 14, further comprising a vehicle.

18. The system of claim 14, further comprising an aircraft comprising the display and the optical transmission layer.

19. The system of claim 14, wherein the optical transmission layer is configured to reduce a luminance of the illuminated images output from the display by absorbing light output from the display.

* * * * *